United States Patent [19]

Ohtsuka et al.

[11] Patent Number: 4,848,280
[45] Date of Patent: Jul. 18, 1989

[54] INTAKE APPARATUS FOR INTERNAL COMBUSTION ENGINE

[75] Inventors: Takenori Ohtsuka; Yasuo Honda, both of Hiroshima; Tomohiro Sunada, Higashihiroshima; Yasuhiro Kawasako; Tomoyuki Yamamoto, both of Hiroshima, all of Japan

[73] Assignee: Mazda Motor Corporation, Hiroshima, Japan

[21] Appl. No.: 141,764

[22] Filed: Jan. 11, 1988

[30] Foreign Application Priority Data

Jan. 9, 1987 [JP] Japan .................................. 62/1926
Jan. 9, 1987 [JP] Japan ............................. 62/1060[U]

[51] Int. Cl.⁴ ............................................. F02B 75/18
[52] U.S. Cl. ............................................. 123/52 MC
[58] Field of Search ......... 123/52 M, 52 MB, 52 MC, 123/52 MV

[56] References Cited

U.S. PATENT DOCUMENTS

| | | | |
|---|---|---|---|
| 4,228,769 | 10/1980 | Gartner et al. | 123/52 M |
| 4,409,934 | 10/1983 | Kaindl | 123/52 M |
| 4,497,287 | 2/1985 | Schleiermacher et al. | 123/198 E |
| 4,669,428 | 6/1987 | Ichida et al. | 123/52 MV |
| 4,702,203 | 10/1987 | Ohmi et al. | 123/52 MV |
| 4,708,097 | 11/1987 | Hatamura et al. | 123/52 M |
| 4,719,879 | 1/1988 | Kato et al. | 123/52 M |

FOREIGN PATENT DOCUMENTS

| | | | |
|---|---|---|---|
| 1136080 | 5/1957 | France | 123/52 M |
| 56-105626 | 8/1981 | Japan . | |
| 59-165562 | 11/1984 | Japan . | |
| 61-036126 | 3/1986 | Japan . | |
| 0255217 | 11/1986 | Japan | 123/52 M |

Primary Examiner—David A. Okonsky
Attorney, Agent, or Firm—Fleit, Jacobson, Cohn, Price, Holman & Stern

[57] ABSTRACT

An internal combustion engine of the in-line type having a surge tank located above the engine. Intake tubes connect the surge tank with the in-line engine cylinders. The tubes extend from one side of the engine body in a direction away from the engine body and are then curved upwardly in a U-shaped manner toward the surge tank. Surge tank openings and the ends of the intake tubes connected together are both formed as ellipses having a major axis lying in a direction parallel to the cylinder axes. The cross-sectional shape of the intake tubes gradually changes from an ellipse into a circle at approximately the middle or bend of the intake tube.

13 Claims, 4 Drawing Sheets

INTAKE APPARATUS FOR INTERNAL COMBUSTION ENGINE

BACKGROUND OF THE INVENTION

1. Field of the Invention

The present invention relates to a novel construction for an internal combustion engine used in an automotive vehicle and, more particularly, to an in-line internal combustion engine having a novel intake structure. The invention relates specifically to an-in-line internal combustion engine whose cylinders are arrayed in a common straight line as opposed to a V-type internal combustion engine whose cylinders are arrayed in two inclined rows and form a V-shape.

2. Description of the Prior Art

An internal combustion engine is known which has a surge tank of relatively large volume. Because the surge tank has a large volume, it is usually located above the engine body. Recently, an in-line engine has been developed with improved charging efficiency obtained by means of dynamic effects, such as, inertial effects. The engine is designed such that the surge tank is connected by discrete intake tubes to a plurality of cylinders disposed in the engine body. For this engine, making the discrete intake tubes as long as possible is desirable in order to achieve optimum dynamic effects for the range of predetermined engine speed. When long intake tubes are used, it is important to arrange them compactly in the space afforded or provided for the engine in the automobile.

Japanese Utility Model Publication No. 59(1984)-165562 discloses an arrangement wherein a surge tank is located above an engine body, and discrete intake tubes connect intake ports formed in a engine body to the surge tank. The intake tubes are formed in a curved shape. More specifically, the discrete intake tubes are designed to extend from one side of the engine body, in a direction away from the engine body, and then to curve upwardly in a U-shaped manner toward the surge tank where they are connected.

However, such an arrangement for an in-line engine is inherently unable to withstand, absorb or dissipate vibration in a satisfactory manner. Such an intake structure connected to the surge tank and throttle body is subject to unwarranted vibration during the engine operation due to the heavy weight of the surge tank and the throttle body. The vibration occurs mainly in a vertical plane parallel to the axis of cylinders. It was thought that one way of suppressing these unwanted vibrations would be to make the wall thickness of the intake tubes greater, the idea being to enhance the stiffness of the intake tubes. Increasing the wall thickness, however, only serves to increase the weight of the intake tubes, and the result is unacceptable.

SUMMARY OF THE INVENTION

The primary object of the present invention is to provide an in-line automotive internal combustion engine with a novel intake apparatus therefor which has high vibration resistance without increasing intake duct weight.

The object of the present invention is achieved by forming the intake tubes or ducts with an elliptical cross-section where the intake tubes connect to the surge tank which, in turn, defines openings of identical elliptical geometry to match and register with the ends of the intake tubes. The intake tubes, from their ends attached to the surge tank up to a point adjacent the U-bends, define a transition region where the cross section of the tubes changes from elliptical geometry to circular geometry. From this point to where the intake tubes connect to the engine, the cross section of the intake tubes is of circular geometry.

The major axis of the elliptical ends of the tubes is parallel to the axes of the engine cylinders. The minor axis of the elliptical ends of the tubes is substantially equal to the diameter of the circular cross section portion of the intake tubes. In the arrangement of the present invention, the elliptical intake tubes, where they are connected to the surge tank, are formed with the longest possible major axis. Any vibration of the surge tank, which in the plane parallel to the cylinder axes, is effectively suppressed by the intake tube walls.

In addition to the foregoing effect, because the openings defined by the surge tank which connect with the intake tubes are also formed as matching and registering ellipses, resistance to air flowing in the intake tubes is decreased substantially and high volumetric efficiency is obtained.

The silhouette or protrusion of the intake tubes to the side of the engine body is not increased by the intake tube configuration of the present invention. The cross-sectional shape is circular at the middle or U bend of the tube, the part furthest or remotest from the engine.

Other and further objects will be apparent from the following description of a preferred embodiment when taken in conjunction with the appended drawings.

DESCRIPTION OF THE PREFERRED EMBODIMENT

Figure 1:
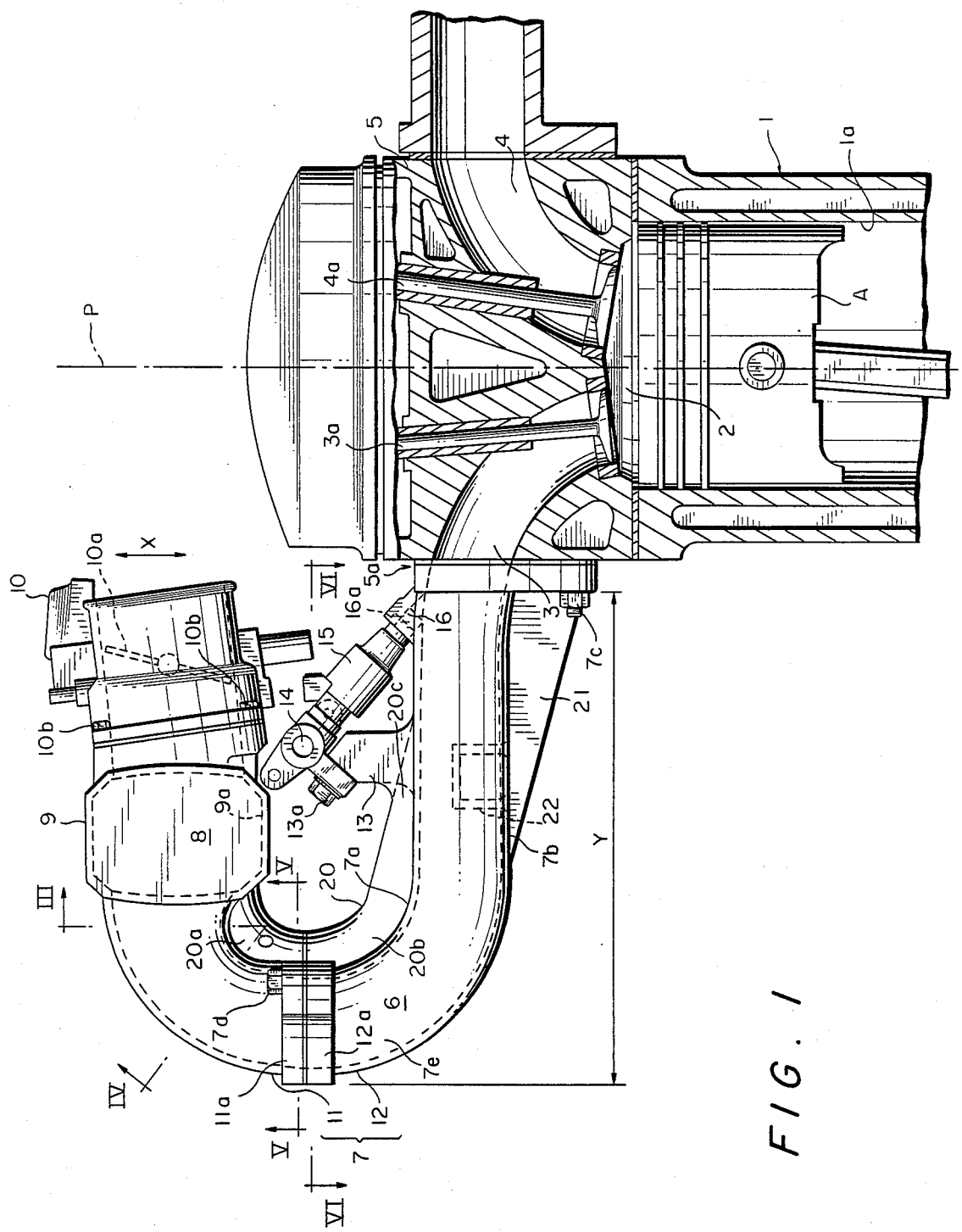
FIG. 1 is a side view, showing a preferred embodiment of the present invention.
Figure 2:
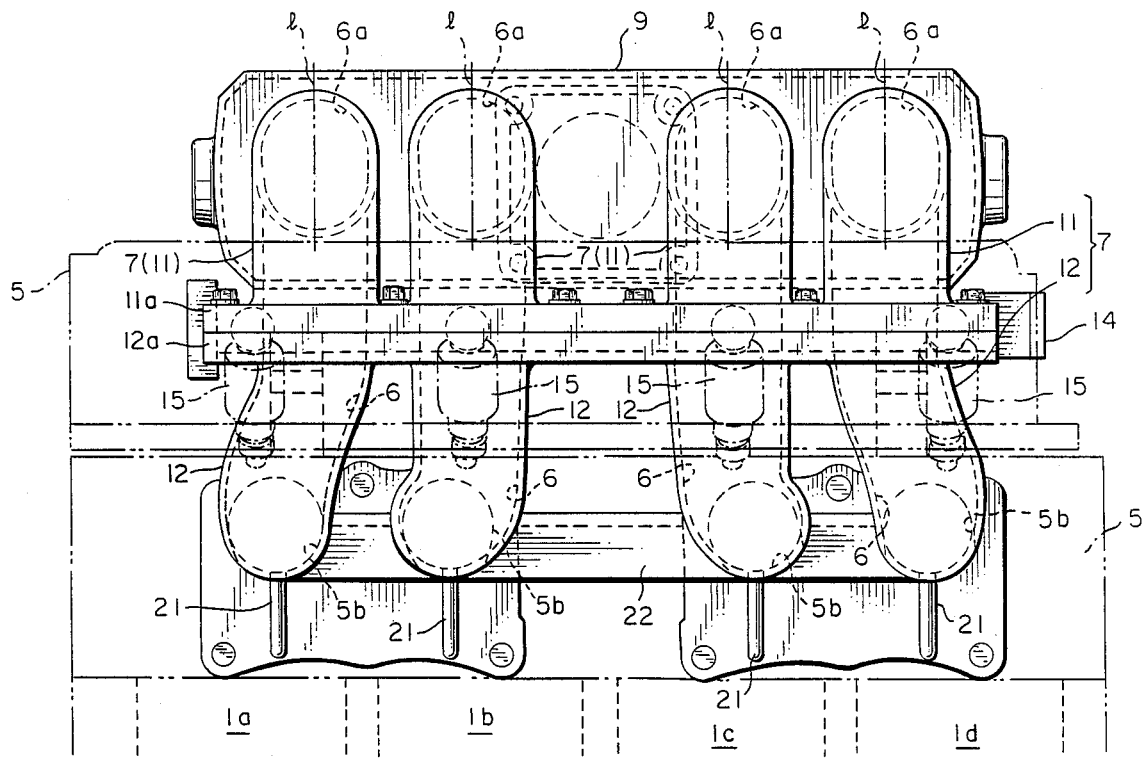
FIG. 2 is an elevational view of FIG. 1 view from the left side.

Referring to the drawings in detail, and FIGS. 1 and 2 in particular, an engine body 1 of an in-line four-cylinder engine is shown having first to fourth cylinders 1a, 1b, 1c, 1d. A combustion chamber 2 is formed in each cylinder 1a, 1b, 1c, 1d and is provided with an intake port 3 and an exhaust port 4. An intake valve 3a and an exhaust valve 4a control ports 3 and 4. A piston A operates in each cylinder.

Intake apparatus for the engine body 1 consists of discrete intake tubes 7 defining discrete intake passages 6 extending from a surge tank 9 to the cylinders. Within surge tank 9 an air chamber 8 is defined. A throttle body 10 having a throttle valve 10a mounted within it is connected to the upstream side of surge tank 9. A common air inlet tube (not shown) connects to the upstream side of body 10.

The discrete intake tubes 7 are connected to a side portion of the engine body 1, more specifically, with a side portion 5a of the cylinder head 5 to align with inlet ports 3 by six (a plurality) bolts 7c, and the intake tubes are connected inpairs to the cylinders 1a, 1b, 1c, 1d. The discrete intake tubes 7 also extend initially in a direction away from the side of the engine body 1, are then curved or looped upwardly in a U-shape and turned toward the surge tank 9, and are connected with a side portion of the surge tank 9 at their other ends on the upstream side. The cross sectional shape of the surge tank is a rectangle being long in direction normal to cylinder axes p. Because of their design and configuration, the discrete intake tubes 7 are of sufficient length to achieve the requisite dynamic effects; the engine remains compact as a whole.

Each of the discrete intake tubes 7 is constructed of two parts, an upstream tube part 11 and a downstream tube part 12. The joint between tube part 11 and tube part 12 is located approximately at the middle position of the U bend or curved portion 7e. The upstream tube part 11 is formed integrally or fixed with the surge tank 9 and is provided with a flange 11a at its downstream end with the opening at the downstream end facing downwardly for connection to flange 12a of the downstream tube part 12. Flanges 12a and 11a lie horizontally, so the upstream opening of tube part 12 is facing upwardly. Connecting flanges 11a and 12a formed at the middle position of the curved portion 7e increase the strength of the curved portion 7e. Six bolts 7d connect flanges 11a and 12a together. The throttle body 10 is connected to the upstream side of the surge tank 9 via registering and matching surfaces and bolts 10b.

Bosses 13 are formed on inner side or upper portions 7a of the two discrete intake tubes 7 connected to the first and fourth cylinder 1a, 1d. A delivery pipe 14 extending parallel with the engine body 1 down the line of cylinders is installed on the bosses 13 by two bolts 13a. Fuel injection valves 15 are supported partly by the delivery pipe 14, and partly by fuel injection valves installing bosses 16 defining holes 16a near the point where the tubes 7 are connected to ports 3. The fuel injection valves 15 are fixed by the fuel injection valve installing holes 16a and the delivery pipe 14 (See FIG. 1). The bosses 13 are located between the fuel injection valves 15 for the first and second cylinders 1a and 1b, and between the fuel injection valves 15 for third and fourth cylinders 7c and 7d, respectively. In this fashion, the forces imposed on each of fuel injection valves 15 by delivery pipe 14 can be leveled or equalized.

Inner ribs 20 are formed on the inner side or upper portions 7a of the discrete intake tubes 7, and outer ribs 21 are formed on outer side or underneath portions 7b of the discrete intake tubes 7. Each of the inner ribs 20 is constructed of two parts, an upstream inner rib part 20a formed integrally with the upstream tube part 11 and the surge tank 9 and a downstream inner rib part 20b formed integrally with the downstream tube part 12. The downstream inner rib parts 20b are also formed to end gradually at the middle of the downstream tube part 12. Furthermore, the downstream portion 20c of the downstream inner rib parts 20b on the downstream tube parts 12 for the first and fourth cylinders 1a and 1d are formed to continue to and merge into the bosses 13. Reinforcement 22 is integrally formed with the discrete intake tubes 7 and is continuous in the direction of the cylinder row.

With the arrangement described for the discrete intake tubes 7 for the first and fourth cylinders 1a and 1d (formed with the bosses 13), the structure to reinforce consists of the inner ribs 20, the bosses 13, delivery pipe 14 and the fuel injection valves 15. Compared to a structure where inner ribs continue to the downstream end of the discrete intake tubes 7, the structure of the present invention achieves an increase of strength of the discrete intake tubes 7 using small or shorter inner ribs 20.

Figures 3, 4, 5:
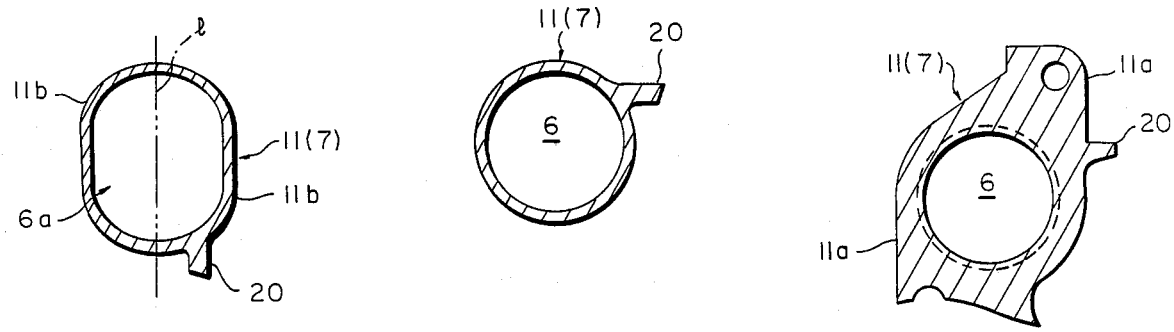
FIG. 3 is a cross-sectional view of FIG. 1 taken along line O–III.
FIG. 4 is a cross-sectional view of FIG. 1 taken along line O–IV.
FIG. 5 is a cross-sectional view of FIG. 1 taken along line V—V.
Figure 6:
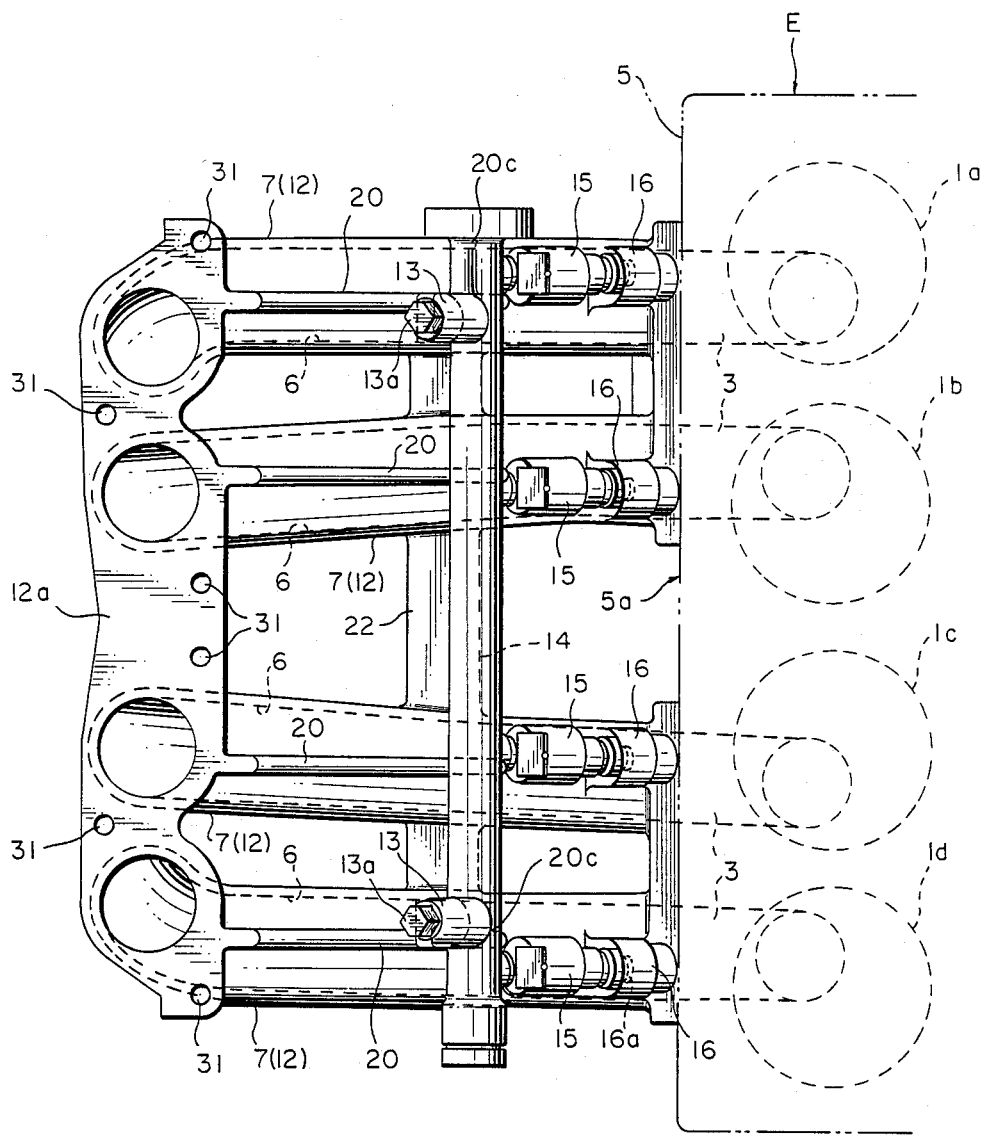
FIG. 6 is a plan view of FIG. 1 taken along line VI—VI with surge tank and top parts of the intake tubes removed.
Figure 7:
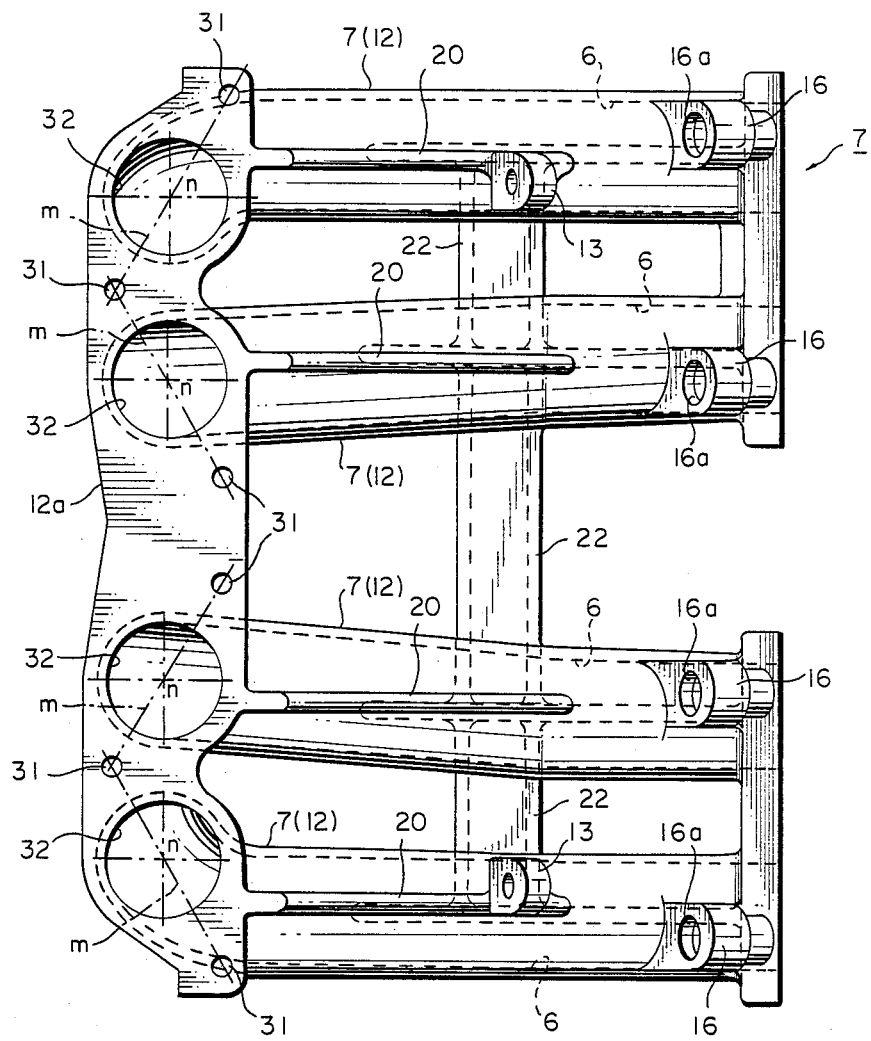
FIG. 7 is a plan view similar to FIG. 6 with fuel injection valves and delivery pipe removed.

As shown in FIGS. 3, 4 and 5, surge tank 9 is connected via openings 6a to the discrete intake tubes 7. Both are formed with matching or registering cross sections of elliptical geometry. The major axes 1 of the ellipses extend in a direction parallel to the cylinder axes p. (See FIGS. 1 and 3). In the middle of the discrete intake tubes 7, or specifically at the connecting flange 11a, the cross-sectional shape of the tubes 7 and the intake passages 6 is circular. (See FIG. 5). Between the surge tank openings 6a and the connecting flange 11a, the cross-sectional shape of the upstream tube parts 11 gradually change from an ellipse into a circle. The minor axis of the ellipse at 6a and the matching end 6 is equal to the diameter of the circle at flange 11a. The cross-sectional shape of the downstream tube parts and passages 6 is circular.

Because the cross-sectional shape of the upstream end of the discrete intake passages 6 is formed as an ellipse having a major axis 1 lying in a direction parallel to the cylinder axis p, the vertical tube wall portions 11b of the upstream end of the discrete intake tubes 7 can be formed longer or be elongated. By elongating the tube wall portions 11b, vibration in the direction parallel to the cylinder axis p (See arrows X in FIG. 1) can be resisted, dissipated, absorbed or restrained. Furthermore, as the surge tank openings 6a are formed elliptically, the effective area thereof is larger than a circle, and, as a result, the intake resistance of intake air flowing into the discrete intake tubes 7 is decreased and high volumetic efficiency can be obtained. The protrusion of the discrete intake tubes 7 to one side of the engine body 7 is not increased because the cross-sectional shape of the tubes 7 and passages 6 is circular at the connecting flanges 11a and 12a (see arrows y in FIG. 1).

At the connecting flanges 11a and 12a, bolt holes 31 for bolts 7d are arranged so that a virtual line m connecting two adjacent bolt holes 31 passes through the center of ports 32 of the discrete intake passages 6. Ports 32 are the entry ends at flanges 11a and 12a. The registering faces of the connecting flanges 11aand 12a, which include web portions that end parallel to the cylinder row, can be sealed completely by a seal or gasket because the forces imposed about the joint are equalized or leveled. A lower wall 9a of the surge tank 9 is formed to slope upwardly to the openings 6a. This lower wall 9a smoothly guides intake air to each of the discrete intake tubes 7.

It is to be understood that the foregoing description and drawings relate to a preferred embodiment of the present invention and is given by way of example not limitation. Various other embodiments and variants are possible within the spirit and scope of the invention.

What is claimed is:

1. An internal combustion engine for a vehicle comprising:
   an engine body having a plurality of cylinders arranged in series with their cylinders in a line with the axes of the cylinders lying in a common plane and having on one side thereof an intake port for each of the cylinders;

a surge tank located above said engine body and having a pair of opposed sidewalls, one sidewall near the plurality of cylinders and the other sidewall remote from the plurality of cylinders, said other sidewall lying in a plane parallel to the common plane in which the axes of the cylinders lie and defining a plurality of in-line elliptical openings; and a plurality of discrete intake tubes connecting, for independent air flow, the elliptical openings of said surge tank to the intake ports for said cylinders;

each of said discrete intake tubes shaped to extend from said one side of said engine body in a direction substantially normal to the common plane in which the axes of the cylinders lie outwardly away from said engine body to beyond the surge tank and then being curved upwardly in a U-shaped manner to substantially the level of the other sidewall of the surge tank and then extending back toward said other sidewall of said surge tank; and each of said discrete intake tubes formed with its end connected to said surge tank defining a matching elliptical opening having a major axis lying substantially in the plane of the sidewall and parallel to the common plane in which the axes of the cylinders lie and defining a transition region extending from said end with its cross-sectional shape gradually changing from an ellipse into a circle.

2. An internal combustion engine as defined in claim 1 further comprising throttle body means having a throttle valve within connected to the one sidewall side of the surge tank.

3. An internal combustion engine as defined in claim 1 wherein the transition region of each of the discrete intake tubes terminates in the curved portion of said each tube.

4. An internal combustion engine as defined in claim 1, wherein a boss, to install a delivery pipe supplying fuel to a fuel injection valve, is formed on an inner side portion of at least one of the discrete intake tubes; and a rib is formed on the inner side portion of said at least one discrete intake tubes that extends from the surge tank to the boss, said rib lying in a plane normal to the common plane of the axes of the cylinders.

5. An internal combustion engine as defined in claim 1, wherein the minor axis of the elliptical opening of each discrete intake tube is substantially equal to the diameter of the circular cross-sectional portion of the discrete intake tube.

6. An internal combustion engine as defined in claim 1, in which each of the discrete intake tubes is divided into two parts, an upstream tube part and a downstream tube part; and at least two bolts connect the upstream tube part with the downstream tube part so that a virtual line connecting the at least two bolts passes through the center of the connected discrete intake tube.

7. An internal combustion engine as defined in claim 4, wherein said engine body has four cylinders, and two bosses are provided, one between the fuel injection valves for the first and second cylinders and the other between the fuel injection valves for the third and fourth cylinders.

8. An internal combustion engine as defined in claim 1, wherein each of the discrete intake tubes is divided into two parts at the middle position of the curved portion, an upstream tube part and a downstream tube part, said upstream tube part and said downstream tube part being connected together in a plane substantially perpendicular to the common plane of the cylinder axes.

9. An internal combustion engine as defined in claim 8, further comprising a flange formed integrally with each said upstream tube part at the downstream end thereof and a flange formed integrally with each said downstream tube part at the upstream end thereof, and said upstream and downstream tube parts are connected by said flanges being connected together.

10. An internal combustion engine as defined in claim 9, wherein at least two bolts connect said flanges so that a virtual line connecting said at least two bolts passes through the center of the connected discrete intake tube.

11. An internal combustion engine as defined in claim 8, wherein all of said upstream tube parts are formed integrally with said other sidewall of said surge tank.

12. An internal combustion engine as defined in claim 4, further comprising a second rib formed on the outer side portion of said at least one discrete intake tube, said second rib lying in a plane substantially normal to the common plane in which the cylinder axes lie.

13. An internal combustion engine as defined in claim 4, further comprising reinforcement means integrally formed with the discrete intake tubes and extending parallel to the common plane in which the cylinder axes lie for reinforcing the plurality of intake tubes.

* * * * *